(12) United States Patent
Koyama et al.

(10) Patent No.: US 11,962,605 B2
(45) Date of Patent: *Apr. 16, 2024

(54) INFORMATION PROCESSING APPARATUS, DATA ANALYSIS METHOD AND PROGRAM

(71) Applicant: NIPPON TELEGRAPH AND TELEPHONE CORPORATION, Tokyo (JP)

(72) Inventors: Takuma Koyama, Tokyo (JP); Keita Hasegawa, Tokyo (JP); Yasushi Okano, Tokyo (JP); Masashi Tanaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 476 days.

This patent is subject to a terminal disclaimer.

(21) Appl. No.: 17/280,835

(22) PCT Filed: Oct. 10, 2019

(86) PCT No.: PCT/JP2019/040032
§ 371 (c)(1),
(2) Date: Mar. 26, 2021

(87) PCT Pub. No.: WO2020/075809
PCT Pub. Date: Apr. 16, 2020

(65) Prior Publication Data
US 2022/0006821 A1 Jan. 6, 2022

(30) Foreign Application Priority Data
Oct. 11, 2018 (JP) .................. 2018-192416

(51) Int. Cl.
G06F 21/00 (2013.01)
H04L 9/40 (2022.01)
(Continued)

(52) U.S. Cl.
CPC ...... *H04L 63/1416* (2013.01); *G06F 11/0751* (2013.01); *G06F 21/552* (2013.01); *G06F 21/554* (2013.01)

(58) Field of Classification Search
CPC ............. H04L 63/1416; H04L 63/1425; G06F 21/554; G06F 21/552; G06F 11/0739;
(Continued)

(56) References Cited

U.S. PATENT DOCUMENTS 7,337,179 B1 * 2/2008 Plain .................. G06F 16/20
10,241,718 B2 * 3/2019 Seo .................... G06F 3/0608
(Continued)

FOREIGN PATENT DOCUMENTS

JP 2009-134470 A 6/2009
WO 2017/104119 A1 6/2017

OTHER PUBLICATIONS

Jun Anzai and Yoshiharu Imamoto, "A proposal for intrusion detection and prevention system for automatic driving vehicles", Symposium on Cryptography and Information Security SCIS 2018, Jan. 23-26, 2018 with English Machine Translation.
(Continued)

*Primary Examiner* — Don G Zhao

(57) ABSTRACT

A storage processing unit configured to store, in a storage unit, first data output by a device or any one of multiple devices in association with first context information related to the first data, and a determining unit configured to obtain second context information related to second data in a case where the second data is received from the device or any one of the multiple devices, and determine whether an analysis of the received second data is necessary based on the received second data and the obtained second context information and based on the first data and the first context information stored in the storage unit, are provided.

8 Claims, 12 Drawing Sheets

(51) Int. Cl.
*G06F 11/07* (2006.01)
*G06F 21/55* (2013.01)

(58) Field of Classification Search
CPC ............ G06F 11/0751; G06F 11/3013; G06F 11/3476; G06F 17/40; G06F 2201/81
See application file for complete search history.

(56) References Cited

U.S. PATENT DOCUMENTS

| | | | | |
|---|---|---|---|---|
| 10,893,059 | B1* | 1/2021 | Aziz | G06F 21/53 |
| 11,132,461 | B2* | 9/2021 | Swafford | G06F 21/577 |
| 11,296,970 | B2* | 4/2022 | Rambo | H04L 43/50 |
| 2005/0187368 | A1* | 8/2005 | Ebling | G06Q 40/10 528/44 |
| 2011/0264662 | A1* | 10/2011 | Umezu | G06F 16/907 707/E17.089 |
| 2011/0321151 | A1* | 12/2011 | Gluck | H04L 63/102 726/11 |
| 2014/0199663 | A1* | 7/2014 | Sadeh-Koniecpol | H04L 63/1408 434/118 |
| 2014/0199664 | A1* | 7/2014 | Sadeh-Koniecpol | G06F 21/564 434/118 |
| 2014/0306799 | A1* | 10/2014 | Ricci | G01C 21/26 340/5.83 |
| 2014/0310186 | A1* | 10/2014 | Ricci | H04W 4/80 705/302 |
| 2014/0324865 | A1* | 10/2014 | Mizutani | G06F 11/079 707/737 |
| 2014/0366137 | A1* | 12/2014 | Tatarinov | G06F 21/562 726/24 |
| 2016/0014159 | A1* | 1/2016 | Schrecker | H04L 63/20 726/1 |
| 2016/0318490 | A1* | 11/2016 | Ben Shalom | B60W 30/18154 |
| 2016/0371471 | A1* | 12/2016 | Patton | G06F 16/9538 |
| 2016/0381059 | A1* | 12/2016 | Galula | H04L 63/02 726/23 |
| 2016/0381066 | A1* | 12/2016 | Galula | H04L 63/1441 726/23 |
| 2016/0381067 | A1* | 12/2016 | Galula | H04L 63/1416 726/23 |
| 2016/0381068 | A1* | 12/2016 | Galula | G07C 5/0816 726/23 |
| 2017/0013005 | A1* | 1/2017 | Galula | H04L 63/1425 |
| 2017/0046510 | A1* | 2/2017 | Chen | G06F 21/552 |
| 2017/0093866 | A1* | 3/2017 | Ben-Noon | H04L 63/1425 |
| 2017/0103674 | A1* | 4/2017 | Sadeh-Koniecpol | G06F 21/566 |
| 2017/0279957 | A1* | 9/2017 | Abramson et al. | G06F 21/36 |
| 2017/0300690 | A1 | 10/2017 | Ladnai et al. | |
| 2018/0018456 | A1* | 1/2018 | Chen | G06F 21/552 |
| 2018/0089453 | A1* | 3/2018 | Scholz | G06F 21/31 |
| 2018/0109622 | A1* | 4/2018 | Galula | H04W 84/005 |
| 2018/0130006 | A1* | 5/2018 | Adjaoute | G06Q 10/06398 |
| 2018/0143975 | A1* | 5/2018 | Casal | G06F 40/51 |
| 2018/0262466 | A1* | 9/2018 | Atad | H04L 63/0209 |
| 2018/0307833 | A1* | 10/2018 | Noeth | H04L 63/1425 |
| 2018/0342165 | A1* | 11/2018 | Sweeney | G08G 1/0112 |
| 2018/0365124 | A1* | 12/2018 | Togawa | G06F 11/3041 |
| 2019/0114489 | A1* | 4/2019 | Jackson | G06V 10/82 |
| 2020/0065483 | A1* | 2/2020 | Mu | G06F 21/554 |
| 2020/0186560 | A1* | 6/2020 | Ben-Noon | H04L 63/123 |

OTHER PUBLICATIONS

European Patent Application No. 19871063.4, Extended European Search Report dated Jan. 28, 2022, 7 pages.

* cited by examiner

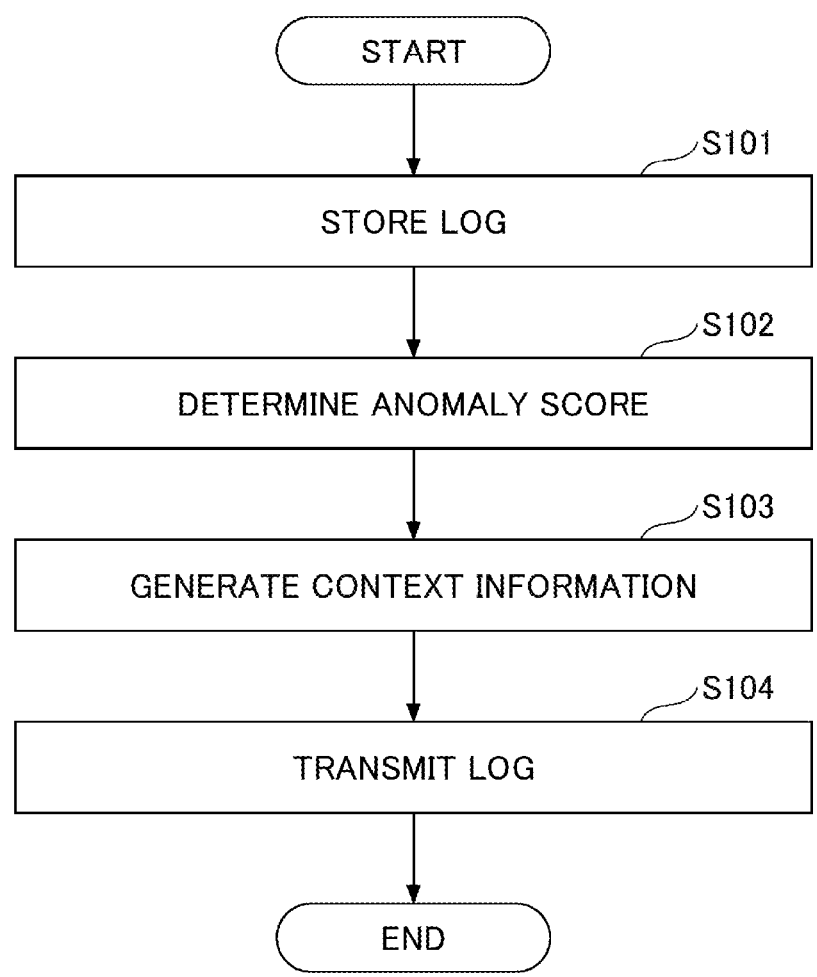

FIG.6A

| DATE AND TIME | VEHICLE ID | ELEMENT ID | Data[0] | Data[1] | Data[2] | Data[3] | Data[4] | ... |

FIG.6B

| DATE AND TIME | VEHICLE ID | ELEMENT ID | Acc_X | Acc_Y | Acc_Z | ... |
|---|---|---|---|---|---|---|

FIG.7

| DATE AND TIME | VEHICLE ID | ELEMENT ID | Data[0] | Data[1] | Data[2] | Data[3] | Data[4] | ... | ANOMALY SCORE |
|---|---|---|---|---|---|---|---|---|---|
| 0.57551 | AAAAA | xxx | ... | ... | ... | ... | ... | ... | ... |
| 0.58547 | AAAAA | xxx | ... | ... | ... | ... | ... | ... | ... |
| 0.59597 | AAAAA | xxx | ... | ... | ... | ... | ... | ... | ... |

FIG.8

| DATE AND TIME | VEHICLE ID | ELEMENT ID | Acc_X | Acc_Y | Acc_Z | ... | ANOMALY SCORE |
|---|---|---|---|---|---|---|---|
| 0.57551 | AAAAA | yyy | ... | ... | ... | ... | ... |
| 0.58547 | AAAAA | yyy | ... | ... | ... | ... | ... |
| 0.59597 | AAAAA | yyy | ... | ... | ... | ... | ... |

FIG.10

| DATE AND TIME | VEHICLE ID | ELEMENT ID | STATIC CONTEXT | DYNAMIC CONTEXT | COMMUNICATION CONTEXT | ... | LABEL |
|---|---|---|---|---|---|---|---|
| 0.57551 | AAAAA | xxx | ... | ... | ... | ... | ... |
| 0.58547 | AAAAA | xxx | ... | ... | ... | ... | ... |
| 0.59597 | AAAAA | xxx | ... | ... | ... | ... | ... |

INFORMATION PROCESSING APPARATUS, DATA ANALYSIS METHOD AND PROGRAM

CROSS-REFERENCE TO RELATED APPLICATIONS

This application is a U.S. 371 Application of International Patent Application No. PCT/JP2019/040032, filed on Oct. 10, 2019, which application claims priority to and the benefit of JP Application No. 2018-192416, filed on Oct. 11, 2018, the disclosures of which are hereby incorporated herein by reference in their entireties.

TECHNICAL FIELD

The present invention relates to an information processing apparatus, a data analysis method, and a program.

BACKGROUND ART

In connected cars (vehicles connected to external networks), which are expected to become popular in the future, it is expected that a software update of an electronic control unit (ECU), which is an operation performed at a dealer conventionally after a vehicle is brought to the dealer, will be wirelessly performed for example, thereby improving convenience.

With respect to the above, similarly with conventional IT devices, a concern that vehicles and control devices of the vehicles may be subjected to cyber-attacks from malicious attackers as a result of being connected to external networks has been raised. There is also research showing that an attacker can hijack control of a vehicle by illegally gaining access from an external network and altering an ECU actually mounted in the vehicle.

For such a concern, various countermeasure techniques performed in advance are under consideration, but there is no countermeasure technique that completely prevents the risk of cyber-attacks. Therefore, it is necessary to consider an effective countermeasure that can be performed after cyber-attacks when cyber-attacks occur just in case. If an attack to take control of a vehicle by altering an ECU is considered, in order to take countermeasures in the vehicle, there is a technique of continuously monitoring the communication occurring in an in-vehicle network and detecting an anomaly. In general, however, there are many cases where calculation resources of in-vehicle devices are not sufficient, and it is often difficult to apply an anomaly detection technique that requires a large calculation load.

Therefore, techniques of identifying cyber-attacks are being studied by using cloud computing to analyze logs of a communication path from an external communication device of a vehicle to an ECU (e.g., Non-Patent Document 1).

RELATED ART DOCUMENTS

Non-Patent Documents

Non-Patent Document 1: Jun Anzai and Yoshiharu Imamoto, "A proposal for intrusion detection and prevention system for automatic driving vehicles", Symposium on Cryptography and Information Security SCIS 2018, Jan. 23-26, 2018

SUMMARY OF INVENTION

Problem to be Solved by the Invention

The occurrences of a cyber-attack on a vehicle are usually an extremely small number of events considering the total number of detected anomaly events. That is, when an anomaly event is detected, in order to analyze whether the anomaly event is an anomaly event caused by a cyber-attack, it is generally necessary to analyze a large number of logs, and there is a problem that time and effort are required.

Here, the above-mentioned problem is not limited to vehicles, but is a common problem to be solved for various devices connected to a network.

The present invention has been made in view of the above, and aims to reduce the cost of analyzing data output by a device.

Means for Solving the Problem

In order to solve the above-described problem, an information processing apparatus includes a storage processing unit configured to store, in a storage unit, first data output by a device or any one of a plurality of devices in association with first context information related to the first data, and a determining unit configured to obtain second context information related to second data in a case where the second data is received from the device or any one of the plurality of devices, and determine whether an analysis of the received second data is necessary based on the received second data and the obtained second context information and based on the first data and the first context information stored in the storage unit.

Advantage of the Invention

The cost of analyzing data output by a device can be reduced.

BRIEF DESCRIPTION OF DRAWINGS

FIG. 5 is a flowchart for describing an example of a processing procedure when a log is generated;

FIG. 6A is a drawing illustrating an example configuration of the log;

FIG. 6B is a drawing illustrating an example configuration of the log;

FIG. 7 is a drawing illustrating an example configuration of a control log DB 271;

FIG. 8 is a drawing illustrating an example configuration of a sensor log DB 272;

FIG. 10 is a drawing illustrating an example configuration of a context information DB 173.

EMBODIMENTS OF THE INVENTION

Figure 1:
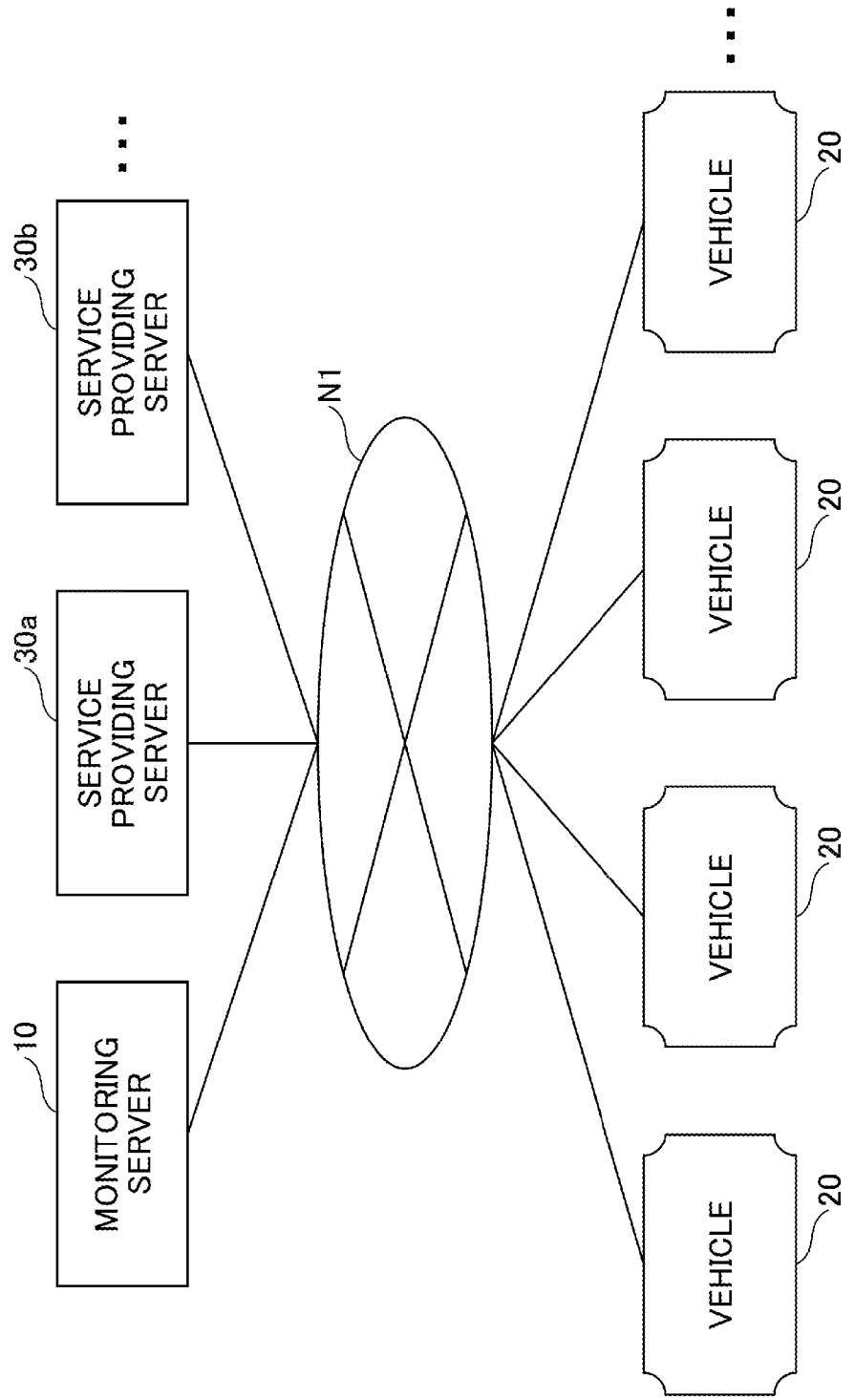
FIG. 1 is a drawing illustrating an example of a system configuration according to an embodiment of the present invention.

In the following, an embodiment of the present invention will be described with reference to the drawings. FIG. 1 is a drawing illustrating an example of a system configuration according to the embodiment of the present invention. In FIG. 1, multiple vehicles 20 are cars (i.e., connected cars) connected to various servers (e.g., a monitoring server 10, a service providing server 30a, and a service providing server 30b) through a network N1 such as the Internet. For example, each vehicle 20 connects to the network N1 through a wireless network such as a mobile communication network, and communicates with various servers.

The service providing server 30a, the service providing server 30b, and the like (which will be hereinafter referred to as the "service providing server 30" if they are not distinguished) are one or more computers that provide a predetermined service, to the vehicle 20 or based on information collected from the vehicle 20. For example, the service providing server 30a may provide telematics services. The service providing server 30b may also provide services based on data collected from each vehicle 20.

The monitoring server 10 is one or more computers that detect the occurrence of an anomaly in the vehicle 20 and analyze contents of the anomaly based on data transmitted (or uploaded) from the vehicle 20. An example of the anomaly is a network-based cyber-attack against the vehicle 20.

Figure 2:
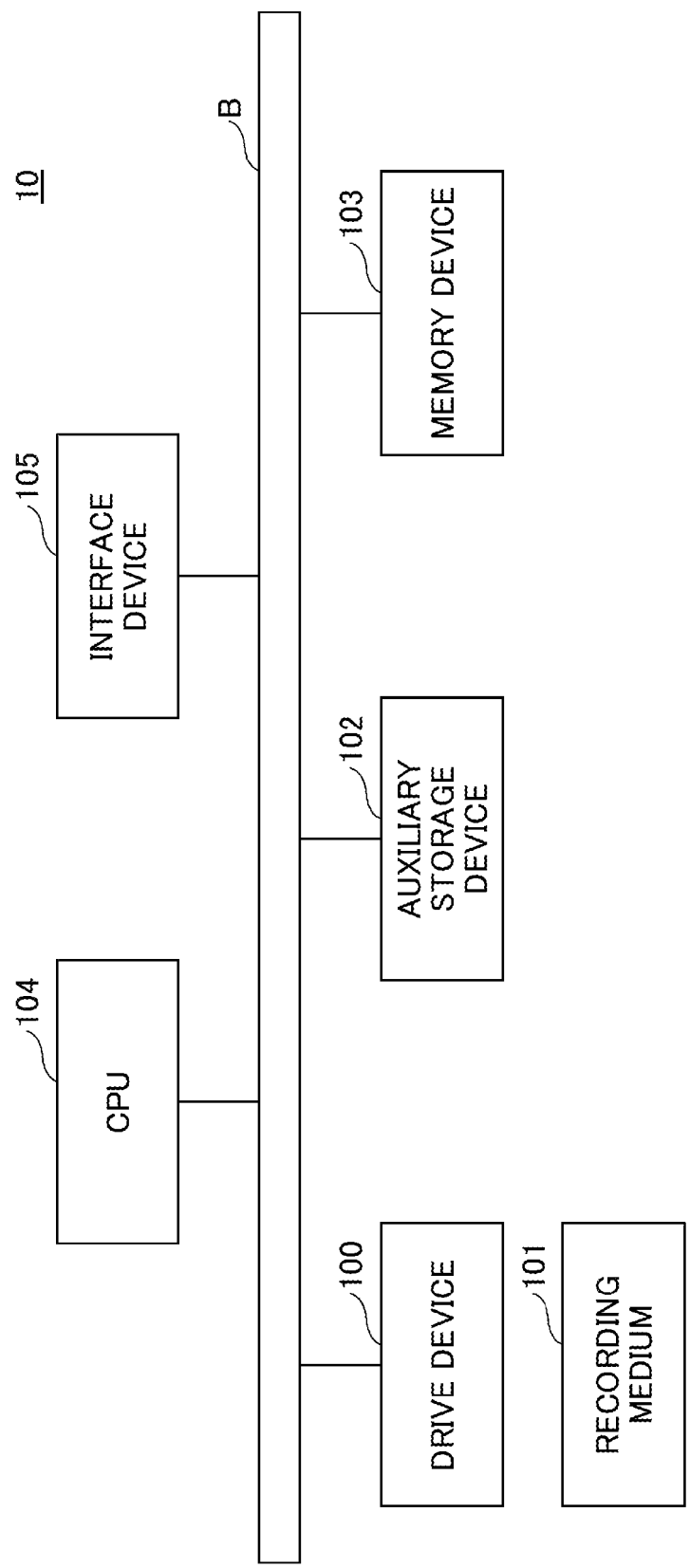
FIG. 2 is a drawing illustrating an example of a hardware configuration of a monitoring server 10 according to the embodiment of the present invention.

FIG. 2 is a drawing illustrating an example of a hardware configuration of the monitoring server 10 according to the embodiment of the present invention. In FIG. 2, the monitoring server 10 includes a drive device 100, an auxiliary storage device 102, a memory device 103, and a CPU 104, an interface device 105, each of which is interconnected through a bus B.

A program for achieving a process in the monitoring server 10 is provided by a recording medium 101 such as a CD-ROM. When the recording medium 101 in which the program is stored is set in the drive device 100, the program is installed in the auxiliary storage device 102 from the recording medium 101 through the drive device 100. However, the program is not necessarily required to be installed from the recording medium 101, and the program may be downloaded from another computer through the network. The auxiliary storage device 102 stores the installed program and stores necessary files, data, and the like.

The memory device 103 reads out and stores the program from the auxiliary storage device 102 in response to an instruction to start the program. The CPU 104 performs functions related to the monitoring server 10 by executing the program stored in the memory device 103. The interface device 105 is used as an interface for connecting to a network.

Figure 3:
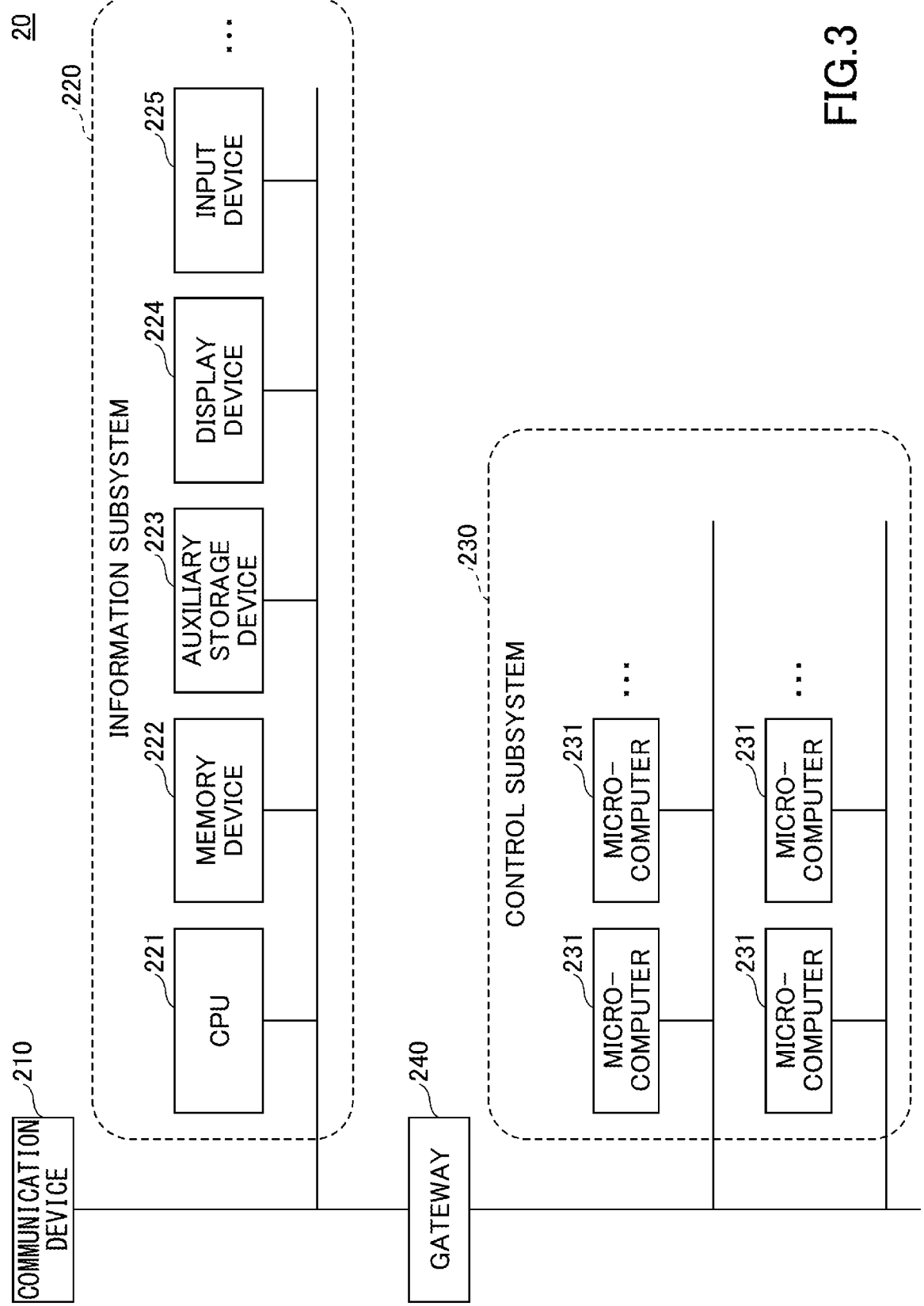
FIG. 3 is a drawing illustrating an example of a hardware configuration of a vehicle 20 according to the embodiment of the present invention.

FIG. 3 is a drawing illustrating an example of a hardware configuration of the vehicle 20 according to the embodiment of the present invention. In FIG. 3, the vehicle 20 includes a communication device 210, an information subsystem 220, a control subsystem 230, and a gateway 240.

The communication device 210 includes a communication module for connecting to the network N1, a communication module for communicating with other vehicles 20, devices on the road, or the like, and a communication module for connecting to smartphones or the like through a wireless LAN or near-range wireless communication.

The information subsystem 220 is a unit of performing information processing according to the installed program and includes a CPU 221, a memory device 222, an auxiliary storage device 223, a display device 224, and an input device 225. The auxiliary storage device 223 stores the installed program and various data used by the program. The memory device 222 reads out and stores a program to be started from the auxiliary storage device 223. The CPU 221 performs functions related to the information subsystem 220 according to the program stored in the memory device 222. The display device 224 displays a programmed graphical user interface (GUI) or the like. The input device 225 is an operational component such as a button or a touch panel and is used to input various operational instructions. For example, an in-vehicle device such as a car navigation system and a head unit of a car audio is an example of the information subsystem 220.

The control subsystem 230 is a unit of controlling a behavior of the vehicle 20 and includes multiple microcomputers 231 for various controls. For example, an electronic control unit (ECU) is an example of the microcomputer 231.

The gateway 240 is a gateway (e.g., a central gateway (CGW)) for connecting the information subsystem 220 to the control subsystem 230. That is, a communication protocol used in the information subsystem 220 is, for example, an IP protocol, and a communication protocol used in communication between the microcomputers 231 in the control subsystem 230 is a non-IP protocol specialized for control (e.g., a controller area network (CAN)). Thus, the gateway 240 is provided to absorb differences in these communication protocols.

Here, the hardware configuration illustrated in FIG. 3 is provided merely as an example. The hardware configuration of the vehicle 20 is not limited to a particular one, as long as the following functions can be achieved.

Figure 4:
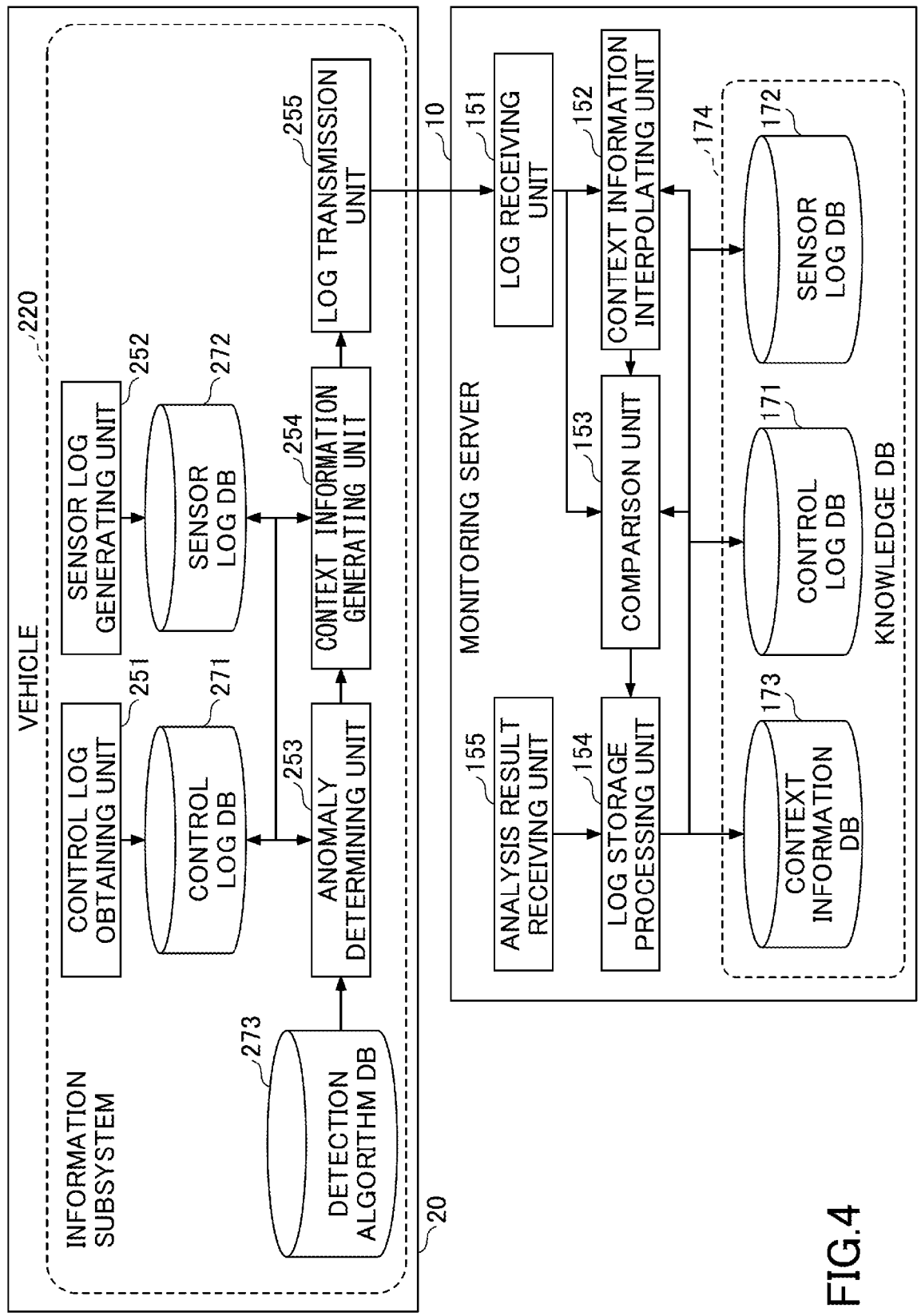
FIG. 4 is a drawing illustrating an example of a functional configuration of the vehicle 20 and the monitoring server 10 according to the embodiment of the present invention.

FIG. 4 is a drawing illustrating an example of a functional configuration of the vehicle 20 and the monitoring server 10 according to the embodiment of the present invention. In FIG. 4, the information subsystem 220 of the vehicle 20 includes a control log obtaining unit 251, a sensor log generating unit 252, an anomaly determining unit 253, a context information generating unit 254, and a log transmission unit 255. Each of these components is achieved by a process in which one or more programs installed in the information subsystem 220 cause the CPU 221 to execute processing. Additionally, the information subsystem 220 includes databases (i.e., storage units) such as a control log DB 271, a sensor log DB 272, and a detection algorithm DB 273. Each of these databases (i.e., storage units) can be achieved by using, for example, a memory device 222 or an auxiliary storage device 223.

The control log obtaining unit 251 obtains a control log and stores (or records) the control log in the control log DB 271. The control log indicates log data related to communication performed by each microcomputer 231 in the control subsystem 230. Data of communication contents itself may be used as the control log. Thus, the control log is generated every time any microcomputer 231 performs communication. The contents of the communication indicate, for example, control of the vehicle 20, information of infotainment such as an audio and a car navigation system, and communication related to an indicator display inside the vehicle 20.

The sensor log generating unit 252 generates a sensor log and stores the sensor log in the sensor log DB 272. The sensor log indicates log data including data (e.g., measurement values obtained by sensors) obtained from sensors provided at various positions in the vehicle 20 (e.g., an accelerometer and a global positioning system (GPS)). The data is obtained from each sensor, and the sensor log based on the data is generated, for example, in a constant period or at timings of the occurrence of a particular event. The timings of generating the sensor log for each sensor may differ. Some sensors among all the sensors included in the vehicle 20 may generate the sensor log.

The anomaly determining unit 253 determines the degree (or level) of anomaly by using a detection algorithm stored in the detection algorithm DB 273 based on the control log and the sensor log (which will be hereinafter simply referred to as the "log", if the respective logs are not distinguished). Specifically, the anomaly determining unit 253 calculates an index value (which will be hereinafter referred to as an "anomaly score") indicating the degree of anomaly in the log generated from the vehicle 20. However, only the control log may be used to calculate the anomaly score, or only the sensor log may be used to calculate the anomaly score. The calculated anomaly score is stored in the control log DB 271 or in the sensor log DB 272.

The context information generating unit 254 generates information related to the log (which will be hereinafter referred to as "context information") indicating states of the vehicle 20, such as a static state of the vehicle 20, dynamically changing information of the vehicle 20, and communication information of the vehicle 20, when the log is obtained or generated. For example, when the anomaly score is calculated, the context information generating unit 254 generates context information related to the vehicle 20 at the time when the log is obtained or generated. The context information may be generated based on a log stored in the control log DB 271 or the sensor log DB 272 or may be generated based on the information obtained from the communication device 210.

When the timing of transmission (or an upload) to the monitoring server 10 (which will be hereinafter referred to as "transmission timing") has come, the log transmission unit 255 attaches the context information to the log stored in the control log DB 271 or in the sensor log DB 272 and transmits the log and the context information to the monitoring server 10.

The monitoring server 10 includes a log receiving unit 151, a context information interpolating unit 152, a comparison unit 153, a log storage processing unit 154, and an analysis result receiving unit 155. Each of these units is achieved by a process in which one or more programs installed in the monitoring server 10 cause the CPU 104 to execute processing. The monitoring server 10 uses databases (storage units) such as the control log DB 171, the sensor log DB 172, and the context information DB 173. The control log DB 171, the sensor log DB 172, and the context information DB 173 are collectively referred to as a knowledge DB 174. Each of these databases (or storage units) can be achieved using, for example, the auxiliary storage device 102 or a storage device that can be connected to the monitoring server 10 through a network.

The log receiving unit 151 receives the log to be transmitted (or uploaded) from the vehicle 20. The log received by the log receiving unit 151 is treated as a suspect event in the monitoring server 10. To the suspect event, the context information (which will be hereinafter referred to as "suspect context") is attached.

The context information interpolating unit 152 generates context information that is lacking and interpolates the suspect context if the suspect context is insufficient. For example, there may be a lack of or an error in the suspect context due to a type of a device inside the vehicle 20, the presence or absence of options, a failure of some of the devices inside the vehicle 20, or the like. The context information interpolating unit 152 may generate the lacking context information based on the information externally obtained through the interface device 105 and may generate the lacking context information based on another context information stored in the context information DB 173 of the monitoring server 10.

The comparison unit 153 compares the suspect event and the suspect context with past events (which will be hereinafter referred to as "known events") stored in the knowledge DB 174 and past context information (which will be hereinafter referred to as "known contexts") to determine whether it is necessary to analyze the suspect event. The known events and the known contexts compared with the suspect event and the suspect context may be events and contexts of different vehicles or of the same vehicle (obtained at different times).

For example, the comparison unit 153 extracts any known event stored in the control log DB 171 or in the sensor log DB 172 and calculates the degree of similarity between the suspect event and the known event. The comparison unit 153 extracts any known context stored in the context information DB 173 and calculates the degree of similarity between the suspect context and the known context. Based on these degrees of similarity, if there is a set of a known event and a known context that is identical or similar to a set of the suspect event and the suspect context, the comparison unit 153 determines that an analysis has already been completed and an analysis of the suspect event is not necessary. With respect to the above, if there is no set of a known event and a known context that is identical or similar to a set of the suspect event and the suspect context, the comparison unit 153 determines that an analysis of the suspect event is necessary. Even if it is determined that the analysis of the suspect event is necessary, and even if it is determined that the analysis of the suspect event is not necessary, the comparison unit 153 may notify an analyst or the like of the suspect event and the suspect context with results of comparing the suspect event and the suspect context with the known event and the known context, and may request the analysis of the suspect event.

The log storage processing unit 154 stores the suspect event in the control log DB 171 or in the sensor log DB 172. The log storage processing unit 154 stores identification information of the microcomputer 231 or the sensor from which the suspect event is output, suspect context information, and the like in the context information DB 173. That is, the knowledge DB 174 stores the log and the context information transmitted from the vehicle 20, and the stored information includes, in addition to events caused by cyber-attacks, events caused by device failures, events caused by user erroneous operations, and events caused by device erroneous detection. The log storage processing unit 154 may delete an old record in records of the control log DB 171, the sensor log DB 172, and the context information DB 173.

The analysis result receiving unit 155 receives an analysis result input by the analyst or the like in response to a request from the comparison unit 153. The analysis result is, for example, a label indicating either 1 (normal) or 2 (abnormal). The 2 (abnormal) label may be subdivided into 2-1 (faults), 2-2 (cyber-attacks), and 2-3 (erroneous detection), and the subdivided labels may be further subdivided depending on contents of the fault or cyber-attack (e.g., 2-1-i, 2-2-i).

The analysis result is registered in the context information DB 173 from the log storage processing unit 154.

In FIG. 4, an example in which the calculation of the anomaly score and the generation of context information are performed in the vehicle 20 is described. However, the calculation of the anomaly score or the generation of context information may be performed in the monitoring server 10. Additionally, the anomaly score or the context information may be entered manually by the analyst or the like.

When the calculation of the anomaly score is performed by the monitoring server 10, the log transmission unit 255 transmits the log to the monitoring server 10 when the transmission timing has come. The anomaly determining unit (which is not illustrated) of the monitoring server 10 calculates the anomaly score as in the anomaly determining unit 253 of the vehicle 20 and stores the anomaly score in the control log DB 171 or the sensor log DB 172.

When the context information is generated in the monitoring server 10, the context information interpolating unit 152 of the monitoring server 10 generates the context information as in the context information generating unit 254 of the vehicle 20 and stores the context information in the context information DB 173. The context information may be generated based on the log stored in the control log DB 171 or the sensor log DB 172 of the monitoring server 10 and may be generated based on information obtained through the interface device 105.

In the following, a processing procedure performed by the information subsystem 220 of the vehicle 20 will be described. FIG. 5 is a flowchart for describing an example of a processing procedure when the log is generated.

When the control log obtaining unit 251 obtains the control log or the sensor log generating unit 272 generates the sensor log, either the control log or the sensor log (which will be hereinafter referred to as a "target log") is stored in the control log DB 271 or the sensor log DB 272 (S101).

FIGS. 6A and 6B are drawings illustrating an example configuration of the log. FIG. 6A illustrates an example of the control log. The control log includes date and time, vehicle ID and element ID, and Data[0], Data[1], Data[2], Data[3], Data[4], . . . , etc. (which will be hereinafter referred to as "Data[ ]"). The date and time are the date and time when the control log has been obtained (i.e., the date and time when communication related to the control log has been performed). The vehicle ID is identification information of the vehicle 20. The element ID is identification information of a component element of the vehicle 20. The element ID in the control log is identification information of the microcomputer 231 that has performed communication related to the control log. Data[ ] is data included in the communication. For example, if the communication is related to the control of the engine, a value of each parameter related to the control of the engine is a corresponding value of Data[ ]. However, data such as checksums and counters may be included in Data[ ], as well as the values of the parameters related to the control of the engine.

With respect to the above, FIG. 6B illustrates an example of the sensor log. The sensor log includes date and time, vehicle ID and element ID, and data specific to a sensor related to the sensor log. The date and time are the date and time when the sensor log has been generated. The vehicle ID is identification information of the vehicle 20. The element ID is identification information of the sensor from which data related to the sensor log is output. Since the sensor log in FIG. 6B is based on data obtained from the acceleration sensor, the sensor log includes Acc_X, Acc_Y, and Acc_Z, as data specific to the acceleration sensor. Acc_X, Acc_Y, and Acc_Z are acceleration in the X-axis direction, acceleration in the Y-axis direction, and acceleration in the Z-axis direction, respectively.

FIG. 7 is a drawing illustrating an example configuration of the control log DB 271. As illustrated in FIG. 7, each record of the control log DB 271 includes items illustrated in FIG. 6A and the anomaly score. Among these items, there is no value for the anomaly score at step S101. This is because the value of the anomaly score is determined in step S102.

FIG. 8 is a drawing illustrating an example configuration of the sensor log DB 272. As illustrated in FIG. 8, each record of the sensor log DB 272 includes items illustrated in FIG. 6B and the anomaly score. Among these items, at step S101, there is no value for the anomaly score for the same reason as the control log DB 271. The format of the sensor log differs in each sensor. For example, a GPS receiver sensor log may include latitude and longitude. Therefore, the sensor log may be stored in a different table of the sensor log DB 272 separately for each sensor (i.e., for each element ID).

The anomaly determining unit 253 determines (or calculates) the anomaly score of the target log and stores the anomaly score in the control log DB 271 or the sensor log DB 272 (S102). The anomaly score may be determined in a constant period, in response to the occurrence of a log including a particular value, or every time a certain size of a log required to determine the anomaly is stored.

The determination (calculation) of the anomaly score of the target log can be performed using known techniques. For example, the anomaly score may be determined based on communication intervals between the microcomputers 231 and data values output by the microcomputers 231. For example, the anomaly score may be determined by inputting the target log into a learned model (e.g., a neural network) that receives the log and outputs the anomaly score. The anomaly score may be 0 or 1 indicating the presence or absence of the anomaly, or the anomaly score may be a value indicating the degree of anomaly in a range from the minimum value (e.g., 0) to the maximum value (e.g., 1). Additionally, the anomaly score may not be determined using both the control log and the sensor log. For example, only either the control log or the sensor log may be used to determine the anomaly score.

The context information generating unit 254 generates context information related to the target log when the anomaly score is determined in the anomaly determining unit 253 (S103).

The context information generating unit 254 generates a static context indicating the static state of the vehicle 20, a dynamic context indicating the dynamically changing information of the vehicle 20, a communication context indicating information regarding communication between the vehicle 20 and an externally connected device, and the like.

Examples of the static context include a type, a model, a model year, a manufacturing date, a shipping date, a machine number, a seller such as an agent, and in-device software information (such as ROM data and version information). Examples of the dynamic context include a current location, a travel route, climate (such as temperature, weather, and a wind speed), a user (such as a driver and an occupant), an externally connected device, the remaining amount of consumables (such as a battery, gasoline, and a lubricant), sensor information (such as temperature, object sensing, an angle, and the number of rotations), actuator information (such as an angle and the number of rotations). Examples of the communication context include the time of communication with the externally connected device, a communication time band, a content of communication, and a change in a vehicle state due to communication. Here, the classification of the context information is for convenience only. For example, if the software of the vehicle 20 is likely to be updated, the software information in the device may be classified in the dynamic context. Any combination of the above context information may be used, and another context information may be used.

For example, if information such as climate and air temperature can be obtained from a smartphone, an external server, or the like through the communication device 210, the context information generating unit 254 generates the dynamic context indicating a weather condition. For example, the context information generating unit 254 generates the dynamic context indicating the location of the vehicle 20 from the sensor log of a GPS receiver stored in the sensor log DB 272. For example, the context information generating unit 254 generates the dynamic context indicating the speed and acceleration of the vehicle 20 by using the sensor log of the GPS receiver stored in the sensor log DB 272 and the control log of the vehicle speed stored in the control log DB 271. The dynamic context and the communication context may be generated as instantaneous values or as continuous or discrete values within a period of time. For example, the communication context indicating an externally connected device at a certain time, or the dynamic context indicating a driver at a certain time, are generated as an instantaneous value. For example, the dynamic context indicating a travel path during a period of time, or the communication context indicating a change in a state of the vehicle due to communication over a period of time, may be generated as continuous or discrete values.

When the transmission timing has come, the log transmission unit 255 attaches the context information to the target log and transmits the target log and the context information to the monitoring server 10 (S104).

The determination of the anomaly score (S102) and generation of the context information (S103) may be performed by the monitoring server 10 after the monitoring server 10 has received the target log.

Figure 9:
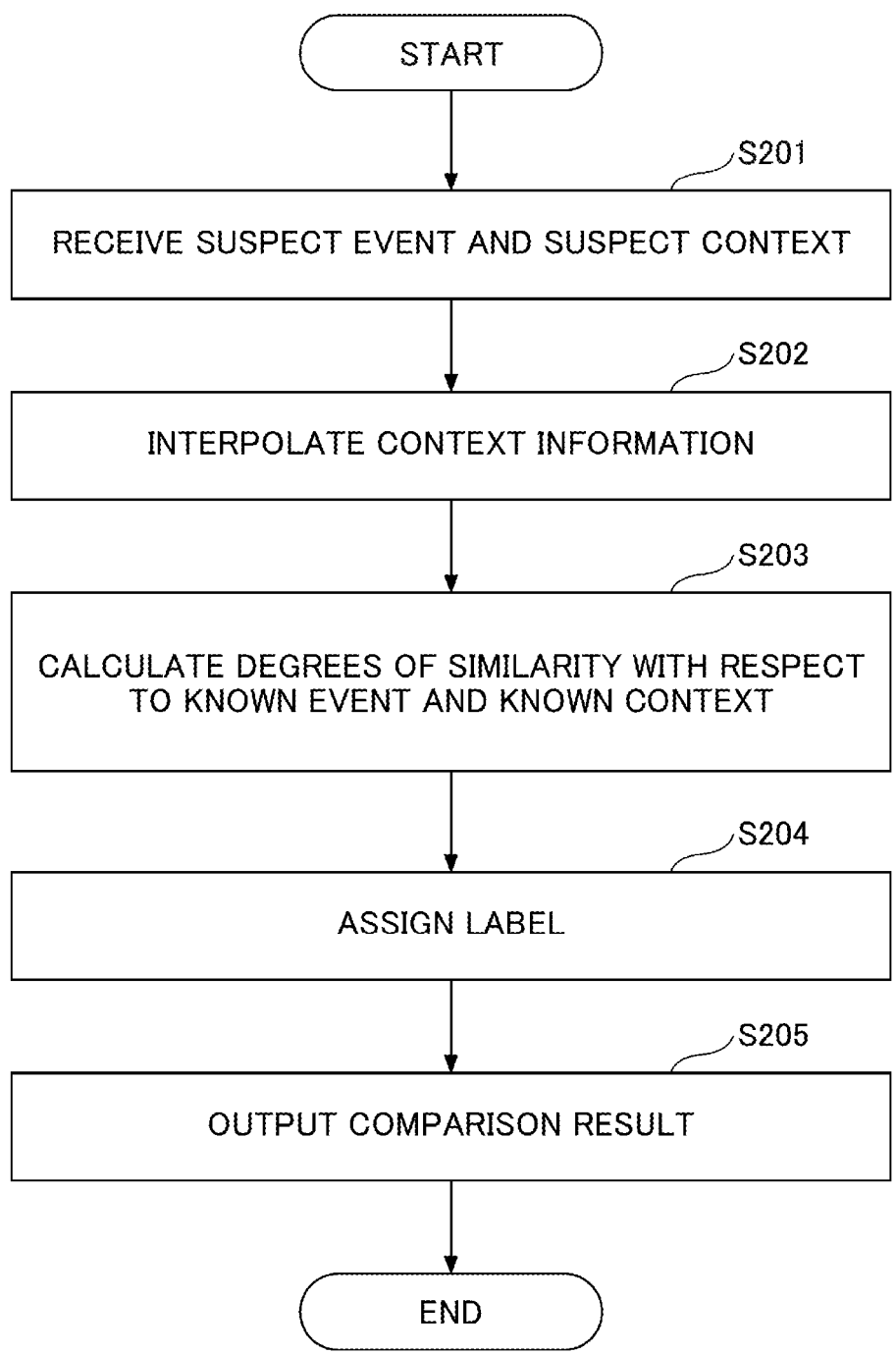
FIG. 9 is a flowchart for describing an example of a processing procedure when the log is received.

In the following, a processing procedure performed by the monitoring server 10 will be described. FIG. 9 is a flowchart for describing an example of a processing procedure when the log is received.

The log receiving unit 151 receives the target log (i.e., the suspect event) with the context information (i.e., the suspect context) (S201).

The context information interpolating unit 152 interpolates the context information if a lack of the suspect context is detected (S202). For example, if the current location of the vehicle 20 is lacking, the context information may be interpolated by identifying another vehicle communicating with the vehicle 20 through Vehicle-to-Vehicle (V2V) and extracting the current location of another vehicle from the context information DB 173, or may be interpolated by estimating the current location of the vehicle 20 from an external device or the like communicating with the vehicle 20 through Vehicle-to-Infrastructure (V2I). If the context information interpolating unit 152 detects a conflict or inconsistency between the suspect context and the context information obtained from the external device or the like, the context information interpolating unit 152 may request another analyzer or an analyst to analyze the suspect event. The conflict or inconsistency of the context information may be caused by failures or cyber-attacks.

The comparison unit 153 extracts any known event stored in the control log DB 171 or the sensor log DB 172. The control log DB 171 and the sensor log DB 172 are configured in a manner similar to that in FIG. 7 and that in FIG. 8, respectively. The comparison unit 153 calculates the degree of similarity between the suspect event and the known event and extracts the known event having the degree of similarity with respect to the suspect event exceeding a threshold value. Similarly, the comparison unit 153 extracts any suspect context stored in the context information DB 173, calculates the degree of similarity between the suspect context and the known context, and extracts the known context having the degree of similarity with respect to the suspect context exceeding a threshold value (S203).

FIG. 10 is a drawing illustrating an example configuration of the context information DB 173. As illustrated in FIG. 10, each record of the context information DB 173 includes the context information and the label in addition to the date and time, the vehicle ID, and the element ID in the control log DB 171 or the sensor log DB 172. In the context information, context information that has been received by the log receiving unit 151 and has been interpolated by the context information interpolating unit 152 as necessary is stored. The label indicating an analysis result is determined in an analysis performed by the analyst or the like. A combination of the vehicle ID and element ID can identify the vehicle 20 and the microcomputer 231 or the sensor from which the suspect event is output. A corresponding relationship between a record of the context information DB 173 and a record of the control log DB 171 or the sensor log DB 172 may be identified by a combination of the date and time, the vehicle ID, and the element ID, or may be identified by adding a log ID indicating a record of the control log DB 171 or the sensor log DB 172 to the context information DB 173.

Extraction of a similar known event or a similar known context in the comparison unit 153 can be performed using a known technique. For example, a pattern matching method such as the Mahalanobis distance measure or the k-nearest neighbors algorithm may be used. Additionally, weights in accordance with context information may be applied in the calculation of the degree of similarity between the suspect context and the known context.

In the calculation of the degree of similarity in the comparison unit 153, an abstraction of an object to be compared may be performed. This is to reduce cases where there is no known event that is identical or similar to the suspect event, or cases where there is no known context that is identical or similar to the suspect context. The method of abstraction is predetermined in accordance with the context information. Temperature context information will be described as an example. For example, if a suspect event has occurred when the outside air temperature is 30° C. and the inside engine temperature is 140° C., a known context in which temperatures are identical to the temperatures is first extracted from the context information DB 173. If there is no known context in which temperatures are identical to the temperatures in the context information DB 173, the known context is abstracted as a known context in which the outside temperature is greater than or equal to 25° C. and less than or equal to 35° C. and the inside temperature of the engine is greater than or equal to 130° C., a known context in which a difference between the outside temperature and the inside temperature of the engine is greater than or equal to 110° C., a known context in which the inside temperature of the engine rises 50% or more while the outside temperature rises less than 0.1% within the unit time, or the like, and a known context that conforming to the abstracted suspect context is extracted from the context information DB 173. As described, a grain size of an object to be compared may be gradually made coarse to extract a similar known event and a known context. A grain size of the abstraction may be reflected in the degree of similarity. If the abstraction is not performed, the degree of similarity may be multiplied by a coefficient of 1. For example, if fine grain size abstraction is performed, the degree of similarity may be multiplied by a coefficient of 0.8. If coarse grain size abstraction is performed, the degree of similarity may be multiplied by a coefficient of 0.5. Here, if similar context information is not found even if abstraction regarding the temperature is performed, the degree of similarity with respect to another context information may be calculated with ignoring the temperature context information. If a predetermined number or more of context information is the same or similar, the context information may be determined to be similar.

If a similar known event or a similar known context is extracted, the comparison unit 153 assigns a label of the known event or the known context registered in the context information DB 173 to the suspect event and the suspect context (S204). If both the suspect event and the suspect context match the known event and the known context, a final label may be assigned. If the suspect event matches the known event but the suspect context does not match the known context, or if the suspect context matches the known context but the suspect event does not match the known event, a provisional label may be assigned.

The comparison unit 153 outputs a result of the comparison performed on the suspect event and the suspect context (S205). Specifically, the comparison unit 153 stores the suspect event in the control log DB 171 or the sensor log DB 172 through the log storage processing unit 154 and stores the suspect context in the context information DB 173 through the log storage processing unit 154. The comparison unit 153 further generates an analysis request for requesting another analyzer, an analyst, or the like to analyze the suspect event and the suspect context. If the final label is assigned, the comparison unit 153 determines that an analysis of the suspect event is not necessary and may store the final label in the context information DB 173 through the log storage processing unit 154.

Another analyzer, an analyst, or the like analyzes the suspect event and the suspect context in response to the analysis request, and determines a label (such as anomaly, failure, a cyber-attack, or erroneous detection) as a result of the analysis. Since the log contains the context information, it can also be determined whether there is a possibility of a large-scale anomaly (i.e., an anomaly across multiple vehicles 20) such as a cyber-attack. The method of analyzing the occurrence of such an anomaly is not limited to a predetermined method. For example, the analysis may be performed based on a learned model (such as a neural network) or the analysis may be performed using another known technique. Additionally, information such as a report from a computer emergency response team (CERT) of an automobile company, a report from a security operation center (SOC) owned by another company, and a report from a security vendor may be used to determine whether there is a possibility of the occurrence of an anomaly. The analysis result receiving unit 155 receives the label determined by another analyzer, an analyst, or the like, and the log storage processing unit 154 registers the received label in a corresponding record of the context information DB 173.

Figure 11:
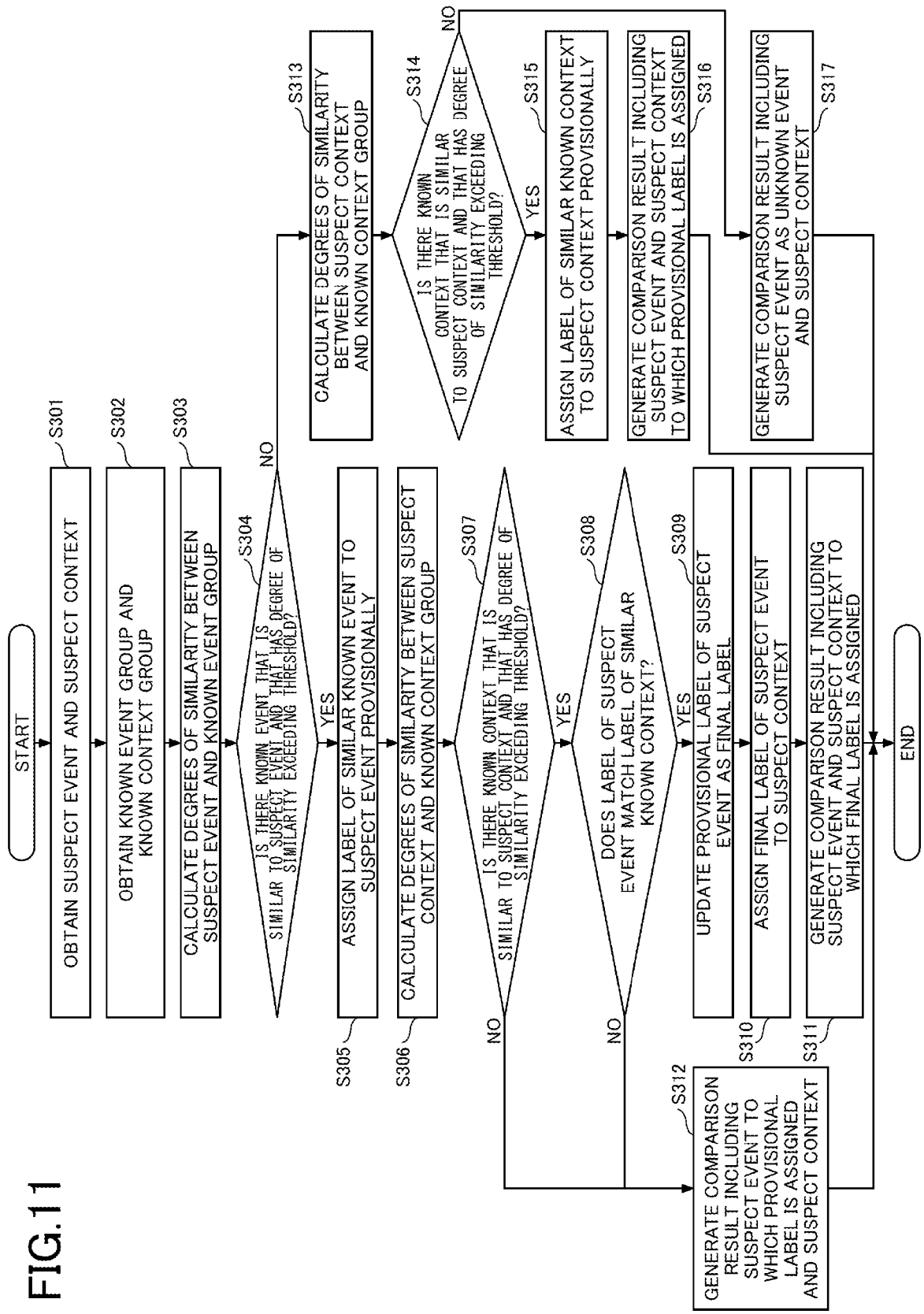
FIG. 11 is a flowchart for describing an example of steps S203 to S205.

In the following, steps S203 to S205 will be described in further detail. FIG. 11 is a flowchart for describing an example of steps S203 to S205. FIG. 11 is a process performed by the comparison unit 153 every time the log receiving unit 151 receives the suspect event and the suspect context.

The comparison unit 153 obtains the suspect event and the suspect context received by the log receiving unit 151 (S301) and obtains one or more known events (which will be hereinafter referred to as a "known event group") and one or more known contexts (which will be hereinafter referred to as a "known context group") from the knowledge DB 174 (S302).

The comparison unit 153 calculates the degrees of similarity between the suspect event and the known event group (S303). If there is a known event having the degree of similarity exceeding a threshold (S304: Yes), a label registered in the context information DB 173 with respect to the known event is provisionally assigned to the suspect event (S305). If there are multiple similar known events, a label of a known event having a highest degree of similarity may be assigned. If labels of the multiple similar known events are the same label or if a proportion of known events having the same label among the multiple similar known events is greater than or equal to a threshold, the label may be assigned.

Similarly, the comparison unit 153 calculates the degrees of similarity between the suspect context and the known context group (S306). If there is a known context having the degree of similarity exceeding a threshold (S307: Yes), a label registered in the context information DB 173 with respect to the known context is obtained. If there are multiple similar known contexts, a label of a known context having a highest degree of similarity may be assigned. If labels of the multiple similar known contexts are the same label, or if a proportion of known contexts having the same label in the multiple similar known contexts is greater than or equal to a threshold, the label may be assigned.

If the label provisionally assigned to the suspect event matches the label of the similar known context (S308: Yes), the comparison unit 153 sets the label assigned to the suspect event as the final label (S309). Further, the final label is assigned to the suspect context (S310). In this case, the label assigned to the suspect event and the label assigned to the suspect context are the same. That is, a case where the label assigned to the suspect event and the label assigned to the suspect context are the same indicates that the label is a final label.

The comparison unit 153 generates a comparison result including the suspect event and the suspect context to which the final label is assigned (S311). The comparison result may include information such as the degree of similarity with respect to the known event and the degree of similarity with respect to the known context. The comparison result may be considered to indicate that an analysis of another analyzer, an analyst, or the like is not required, and the final label may be registered in the context information DB 173. The comparison result may be notified to another analyzer, an analyst, or the like, and when the analysis result receiving unit 155 receives a label input by another analyzer, an analyst, or the like, the received label may be registered in the context information DB 173.

With respect to the above, if there is no known context having the degree of similarity exceeding the threshold value (S307: No) or if the label provisionally assigned to the suspect event does not match the label of the similar known context (S308: No), the comparison unit 153 generates a comparison result including the suspect event to which the label has been provisionally assigned and the suspect context (S312). In this case, a label is provisionally assigned to the suspect event, but not assigned to the suspect context. That is, a case where the label is assigned to only the suspect event indicates that the label is a provisional label. The comparison result may include information such as the degree of similarity with respect to the known event and the degree of similarity with respect to the known context. The comparison result is notified to another analyzer, an analyst, or the like in order to request an analysis of another analyzer, the analyst, or the like. When the analysis result receiving unit 155 receives a label input by another analyzer, the analyst, or the like, the received label may be registered in the context information DB 173.

If there is no known event having the degree of similarity exceeding the threshold value (S304: No), the comparison unit 153 calculates the degree of similarity between the suspect context and the known context group (S313). If there is a known context having the degree of similarity exceeding the threshold (S314: Yes), a label registered in the context information DB 173 with respect to the known context is obtained and the label is provisionally assigned to the suspect context (S315). If there are multiple similar known contexts, a label of a known context having a highest degree of similarity may be assigned. If labels of the multiple similar known contexts are the same, or if a proportion of known contexts having the same label in the multiple similar known contexts is greater than or equal to a threshold, the label may be assigned.

The comparison unit 153 generates a comparison result including the suspect event and the suspect context to which the label is provisionally assigned (S316). In this case, the label is provisionally assigned to the suspect context but is not assigned to the suspect event. That is, a case where the label is assigned to only the suspect context indicates that the label is a provisional label. The comparison result may include information such as the degree of similarity with respect to the known event and the degree of similarity with respect to the known context. The comparison result is notified to another analyzer, an analyst, or the like in order to request an analysis of another analyzer, the analyst, or the like. When the analysis result receiving unit 155 receives a label input by another analyzer, the analyst, or the like, the label may be registered in the context information DB 173.

With respect to the above, if there is no known context having the degree of similarity exceeding the threshold value (S314: No), the comparison unit 153 generates a comparison result including the suspect event and the suspect context to which no label is assigned (S317). In this case, the label is not assigned to the suspect event and is not assigned to the suspect context. That is, a case where the label is not assigned indicates that the suspect event is an unknown event. The comparison result may include information such as the degree of similarity with respect to the known event and the degree of similarity with respect to the known context. The comparison result is notified to another analyzer, an analyst, or the like in order to request an analysis of another analyzer, the analyst, and the like. When the analysis result receiving unit 155 receives a label input by another analyzer, the analyst, or the like, the received label may be registered in the context information DB 173.

In the flow chart above, the degree of similarity between the suspect context and the known context is calculated after the degree of similarity between the suspect event and the known event has been calculated. However, the order of these similarity calculations is not limited. These similarity calculations may be performed in the reverse order, and may be performed simultaneously.

As described, in the present embodiment, the cost required for the analysis can be reduced because the suspect events and suspect contexts that require the analysis can be narrowed. Additionally, the analysis results are reflected in the database, thereby avoiding a situation in which a similar analysis is performed multiple times.

Although the vehicle 20 has been described as an example of a device in the present embodiment, the present embodiment may be applied to other devices having a communication function. For example, the present embodiment may be applied to an industrial control device such as a robot in a factory, sensors arranged at respective locations, an audio device, a home appliance, a communication terminal (e.g., a smartphone and a tablet terminal), or a device generally referred to as an Internet of Things (IoT) device.

As described above, according to the present embodiment, the context information is attached to the data (i.e., the log) generated in the vehicle 20 and the log and the context information are transmitted to the monitoring server 10. The monitoring server 10 may associate and store the transmitted log and the context information in the knowledge DB 174, and can reduce the amount of log to be analyzed by an analyst or the like by referring to the known event and the known context stored in the knowledge DB 174.

The monitoring server 10 can assist an analyst or the like to analyze the log by assigning a label based on the degree of similarity with respect to the known event and the degree of similarity with respect to the known context to the log to be analyzed by the analyst or the like.

Additionally, the monitoring server 10 can reduce a situation where there is no similar known event or no similar known context by interpolating the context information, determining similarity by abstracting an object to be compared, or the like.

In the present embodiment, the vehicle 20 is an example of a device. The monitoring server 10 is an example of an information processing apparatus. The log receiving unit 151 and the log storage processing unit 154 are examples of a storage processing unit. The comparison unit 153 is an example of a determination unit. The context information interpolating unit 152 is an example of an interpolating unit.

The embodiments of the present invention have been described in detail above. However, the present invention is not limited to such a specific embodiment, and various modifications and alterations can be made within the spirit and scope of the present invention as recited in the claims.

This international application is based on and claims priority to Japanese Patent Application No. 2018-192416, filed Oct. 11, 2018, the entire contents of which are incorporated herein by reference.

LIST OF REFERENCE SYMBOLS

10 monitoring server
20 vehicle
30*a* service providing server
30*b* service providing server
100 drive device
101 recording medium
102 auxiliary storage device
103 memory device
104 CPU
105 interface device
151 log receiving unit
152 context information interpolating unit
153 comparison unit
154 log storage processing unit 155 analysis result receiving unit
171 control log DB
172 sensor log DB
173 context information DB
174 knowledge DB
210 communication device
221 CPU
222 memory device
223 auxiliary storage device
224 display device
225 input device
220 information subsystem
230 control subsystem
231 microcomputer
240 gateway
251 control log obtaining unit
252 sensor log generating unit
253 anomaly determining unit
254 context information generating unit
255 log transmission unit
271 control log DB
272 sensor log DB
273 detection algorithm DB
B bus

The invention claimed is:

1. An information processing apparatus comprising:
a processor; and
a memory storing program instructions that cause the processor to
store, in a storage unit, first data output by a device or any one of a plurality of devices in association with first context information related to the first data, the first data representing log data, and the first feature context related to the first data indicating a state associated with the device or the any one of the plurality of devices at a time of the log data being generated or acquired by the device or the any one of the plurality of devices; and
obtain second context information related to second data in response to receiving the second data from the device or any one of the plurality of devices, and determine whether an analysis of the received second data is necessary based on the received second data and the obtained second context information and based on the first data and the first context information stored in the storage unit.

2. The information processing apparatus as claimed in claim 1, wherein the processor calculates a degree of data similarity between the second data and the first data, calculates a degree of context similarity between the second context information and the first context information, and assign a label to the second data and the second context information, the label being determined based on the degree of the data similarity and the degree of the context similarity.

3. The information processing apparatus as claimed in claim 2, wherein the processor determines that the analysis of the received second data is not necessary in a case where both of a condition that the degree of the data similarity exceeds a threshold value and a condition that the degree of the context similarity exceeds a threshold value are satisfied.

4. The information processing apparatus as claimed in claim 2, wherein the processor assigns the label to the second data and the second context information in a case where either a condition that the degree of the data similarity exceeds a threshold value or a condition that the degree of the context similarity exceeds a threshold value is satisfied, the label indicating that there is data similar to the second data or there is context information similar to the second context information.

5. The information processing apparatus as claimed in claim 1, wherein the program instructions further cause the processor to interpolate a part of the second context information.

6. The information processing apparatus as claimed in claim 1, each of the first context information and the second context information includes at least one of a static context indicating a static state of the device, a dynamic context indicating dynamically changing information of the device, or a communication context indicating information related to communication between the device and an externally connected device.

7. A method of analyzing data performed by an information processing apparatus, the method comprising:
storing, in a storage unit, first data output by a device or any one of a plurality of devices in association with first context information related to the first data, the first data representing log data, and the first feature context related to the first data indicating a state associated with the device or the any one of the plurality of devices at a time of the log data being generated or acquired by the device or the any one of the plurality of devices; and
obtaining second context information related to second data in response to receiving the second data from the device or any one of the plurality of devices, and determining whether an analysis of the received second data is necessary based on the received second data and the obtained second context information, and based on a combination of the first data and the first context information stored in the storage unit.

8. A non-transitory computer-readable recording medium having stored therein the program instructions for causing the processor to:
store, in a storage unit, first data output by a device or any one of a plurality of devices in association with first context information related to the first data, the first data representing log data, and the first feature context related to the first data indicating a state associated with the device or the any one of the plurality of devices at a time of the log data being generated or acquired by the device or the any one of the plurality of devices; and
obtain second context information related to second data in response to receiving the second data from the device or any one of the plurality of devices, and determine whether an analysis of the received second data is necessary based on the received second data and the obtained second context information and based on the first data and the first context information stored in the storage unit.

* * * * *